Nov. 27, 1923.
A. R. FIRKINS
1,475,376
SCUFFLER FOR AGRICULTURAL PURPOSES
Filed May 20, 1922
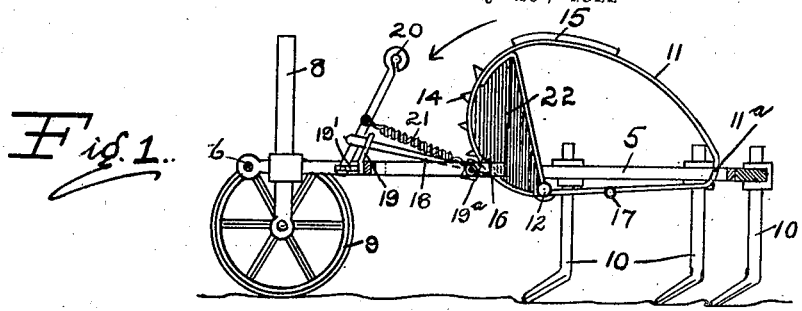
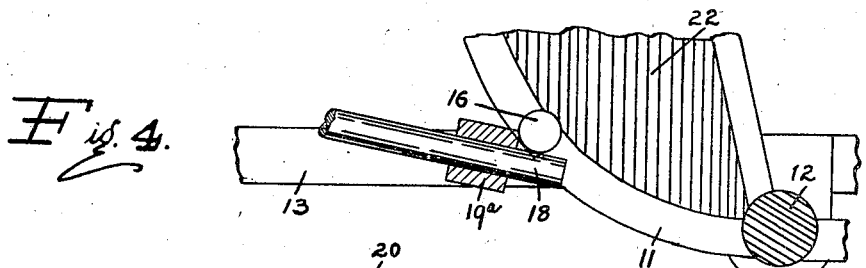
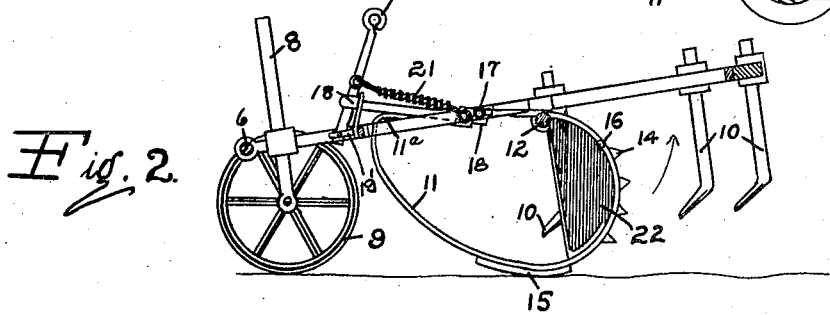
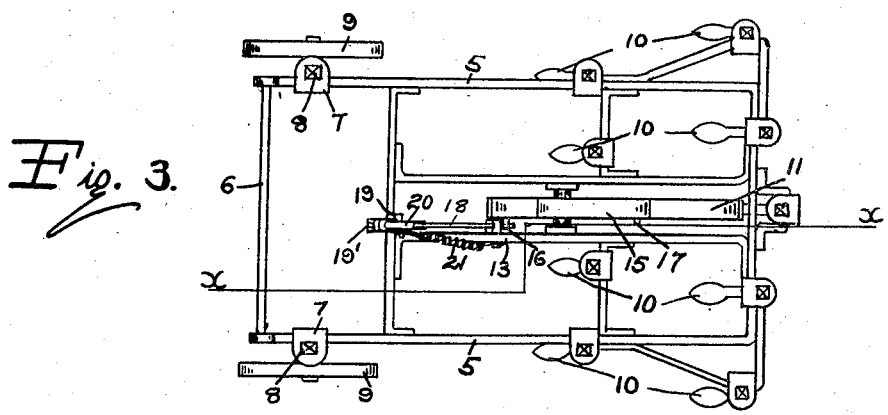
ARTHUR R. FIRKINS,
INVENTOR
BY Norman S. Barlow
ATTORNEY.

Patented Nov. 27, 1923.

1,475,376

UNITED STATES PATENT OFFICE.

ARTHUR ROBERT FIRKINS, OF TENBURY, ENGLAND.

SCUFFLER FOR AGRICULTURAL PURPOSES.

Application filed May 20, 1922. Serial No. 562,510.

*To all whom it may concern:*

Be it known that I, ARTHUR ROBERT FIRKINS, a subject of the King of Great Britain, residing at The Moor, Eardiston, Tenbury, in the county of Worcester, England, have invented a new and useful Improvement in Scufflers for Agricultural Purposes, of which the following is a specification.

This invention has reference to improvements connected with scufflers or cultivators for agricultural purposes, and has for its object to apply to such agricultural implements an over-balanced cam lifting device substantially of a character which has previously been employed in connection with plows. My cam lifting device differs in construction and in its particular method of control from that of the device referred to which has been applied to plows, harrows and other implements, and no claim, per se is made in the present invention to this cam lifting device; the present invention residing in this combination of the said cam lifting device with scufflers or cultivators.

The present invention comprises the combination with scufflers or cultivators of an overbalanced cam lifting device, said device being controlled in its two alternative positions by means of a spring controlled lever and bolt said bolt being adapted to maintain the cam lifting device in one or other of its two alternative positions. In the one position the points of the scuffles or cultivators are in contact with the soil, and in the other position the tilling implement is raised clear of the soil.

My invention will now be described in conjunction with the accompanying sheet of drawings which illustrate its application to a scuffler, similar reference numerals indicating similar parts in the several views:—

Fig. 1 is a part sectional side elevation of a scuffler adapted for attachment to a tractor or other propelling or drawing means, the points of the scuffles being in contact with the soil.

Fig. 2 is a similar elevation to that of Fig. 1, but illustrating the alternative position of the machine the scuffles being raised above the soil.

Fig. 3 is a plan of the complete scuffler, the part sectional elevations Fig. 1 and Fig. 2, being taken on the line x—x of Fig. 3.

Fig. 4 is a part sectional elevation to an enlarged scale of part of the mechanism seen in Fig. 1 illustrating in part the means whereby the bolt maintains the over-balanced cam lifting device in position.

The scuffler as illustrated in Figs. 1, to 4 of the accompanying drawings comprise a substantially rectangular frame 5 the front bar 6 of which may form a drawbar. Mounted in bearing blocks 7 attached to the side bars of the frame 5 by means of rectangular spindles 8 are wheels 9 which forms the forward support for the scuffler. Mounted in the rearward half of the frame by means of suitable brackets in the ordinary manner is a plurality of scuffles or tines 10.

Disposed along the longitudinal centre line of the framework is the overbalanced cam lifting device 11 which is rotatably mounted on the pin 12 mounted in the bars 13 forming part of the frame of the scuffler. This cam lifting device 11 has a loaded or overweighted section 22 the periphery of this section being formed with projecting teeth 14; in addition the periphery of the cam is also formed with a skid 15. Projecting from the side of the cam lifting device 11 and adjacent to the edge thereof are two pins 16 and 17 which are adapted to contact with the positioning bolt 18 to determine the position of the cam lifting device, and therefore of the scuffles or tines 10, in a manner which will be more particularly explained hereinafter. The bolt 18 is mounted in brackets 19 and 19$^a$ secured to the bars 13 of the framework, the forward end of the bolt 18 being pivotally connected to a lever 20 which is fulcrumed at its lower end in the projecting arm 19' of the bracket 19. Connected to the lever 20 at a point midway in its length is a coil spring 21 which is connected at its other end to one of the bars 13 of the framework. The upper end of the lever 20 is eyed and is adapted for attachment to a flexible cord, wire or other connection which is under the control of the driver of the machine.

The operation of the device is clearly seen by a comparison of Figs. 1 and 2 of the drawings and by reference to the enlarged detail Fig. 4. When the scuffles or tines 10 are in tilling contact with the soil as seen in Fig. 1, the cam lifting device occupies the position shown, that is, the pin 16 is in contact with the top of the rear end of the bolt 16, whereby the loaded or overweighted section 22 of the cam is prevented from falling to its normal position about the pin 12.

When it is desired to raise the scuffles or tines 10 from contact with the soil the lever 20 is pulled forward by the driver by means of the connection which obtains to the upper end of this lever; this movement of the lever extends the coil spring 21 and simultaneously withdraws the bolt 18 from the path of motion of the pin 16; as a result the loaded or overweighted section 22 of the cam causes the cam to rotate in the direction of the arrow Fig. 1, thereby bringing the teeth 14 into contact with the surface of the soil and effecting the initial lifting movement of the framework 5 and also of the scuffles or tines 10 which lifting movement continues until the cam lifting device 11 occupies its normal position seen in Fig. 2, when the skid 15 is in contact with the surface of the soil. At this position the pin 17 has come into contact with the top face of the rear end of the bolt 18 which has in the meantime, owing to the release of the lever 20, returned to its normal position in the path of the pins 16 and 17 under the influence of the coil spring 21. The cam lifting device 11 is therefore now maintained in the position seen in Fig. 2 of the drawings and will remain in that position until the lever 20 is again drawn forward, when the pin 17 is released from its contact with the bolt 18 and the cam lifting device 11 owing to its shape and to the drawing or propelling action of the scuffler across the soil rotates the cam device 11 which initially results in a still further lifting of the framework 5 and the scuffles or tines 10 until the cam is turned beyond its nose 11$^a$ when its motion is completed to the position seen in Fig. 1 by the loaded or overweighted section 22.

What I claim is:—

A scuffler or cultivator for agricultural purposes, comprising in combination, land wheels, a frame adjustably mounted to said land wheels said frame pivoting on the axles of said land wheels, an inner frame disposed within the before mentioned frame in which is pivotally mounted an overbalanced cam, cultivating tines disposed on said frames, and spring controlled means for retaining the overbalanced cam in its raised or lowered position; substantially as set forth.

In testimony whereof, I have signed my name to this specification.

ARTHUR ROBERT FIRKINS.